May 25, 1926.
H. K. SEUNG
LEAF SPRING LUBRICATING MEANS
Original Filed Sept. 26, 1923
1,585,881
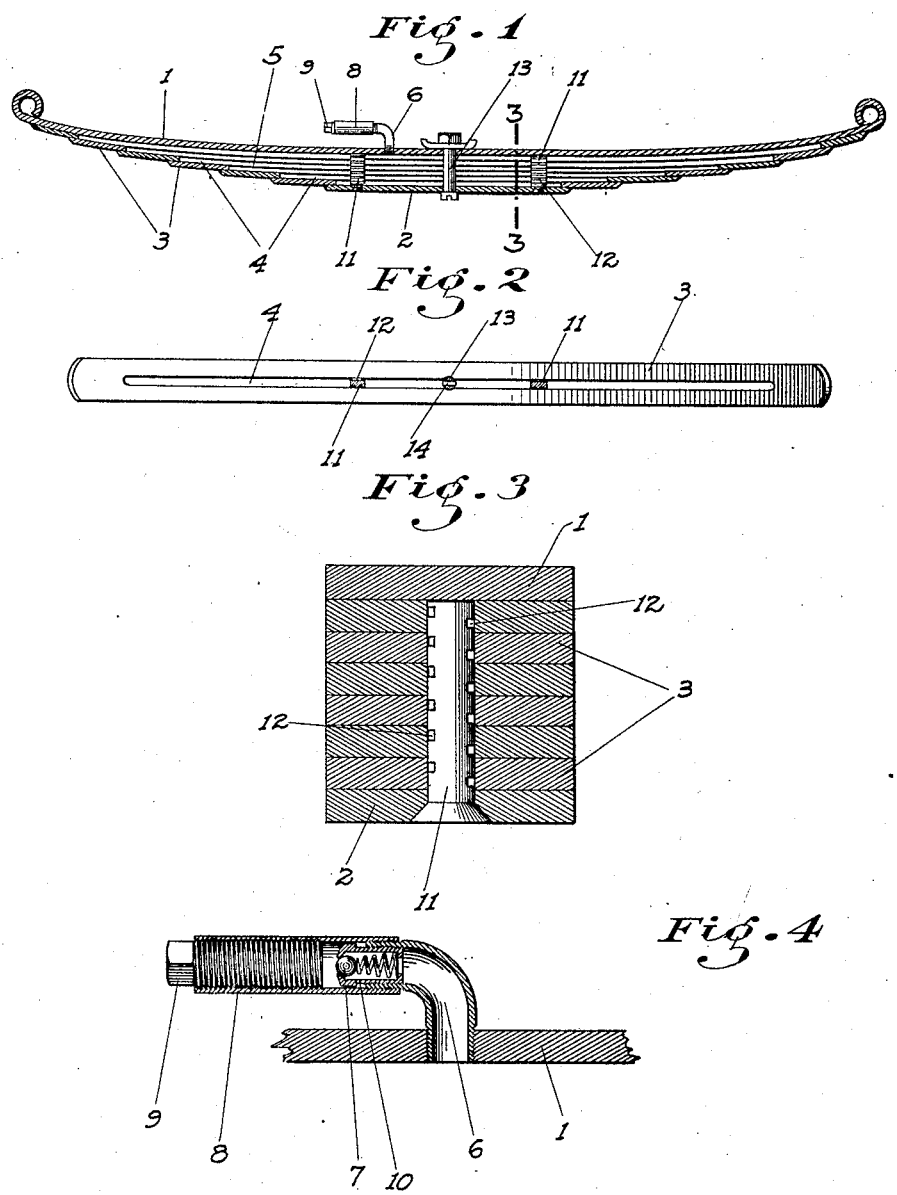
INVENTOR.
Hong K. Seung
BY
ATTORNEY Patented May 25, 1926.

1,585,881

UNITED STATES PATENT OFFICE.

HONG KIM SEUNG, OF STOCKTON, CALIFORNIA.

LEAF-SPRING LUBRICATING MEANS.

Application filed September 26, 1923, Serial No. 664,821. Renewed October 28, 1925.

This invention relates to improvements in vehicle springs of the multiple leaf type, and which are designed as half and full elliptic, cantilever, and like types.

The principal object of my invention is to so form the leaves that a chamber for the reception of oil or grease is had between the upper and lowermost leaves on each side of the longitudinal center or fulcrum point of the spring, so that the contacting surfaces of each pair of leaves will be lubricated continuously and without attention on the part of the operator other than an occasional replenishing of the lubricant.

This construction, as will be evident, is an effective preventative of spring squeaks, a common source of annoyance due to the rubbing together of the dry surfaces of the leaves when the spring is subjected to the numerous shocks incident to road travel.

I have also provided a spring structure in which the lubricant-carrying chambers may be easily formed during the manufacture of the individual leaves without increasing the cost of the spring to any appreciable degree.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views:

Fig. 1 is a longitudinal section of a semi-elliptic leaf spring, showing the lubricant chamber formed therein.

Fig. 2 is a plan view of an intermediate spring leaf.

Fig. 3 is an enlarged cross section on the line 3—3 of Fig. 1.

Fig. 4 is an enlarged sectional view of a lubricant-inserting nipple and valve.

Referring now more particularly to the characters of reference on the drawings, the numeral 1 denotes the upper leaf, 2 the lower leaf, and 3 the intermediate leaves, of a leaf-spring of ordinary type, the leaves being formed, as is customary, of gradually decreasing lengths from the top leaf down.

Cut in each intermediate leaf and extending lengthwise thereof is a slot 4, the slots in all said leaves being proportionate to the length of their respective leaves, and being arranged so that the end of any slot is overlapped by the solid end of the leaf below. The result is therefore that when the leaves are assembled in their proper superimposed order an enclosed chamber 5 is formed between the top and bottom leaves.

Grease or similar lubricant is preferably forced under pressure into the said chamber, and to enable this to be easily accomplished, I provide a nipple or pipe connection 6 mounted on the upper solid leaf 1 and communicating with the chamber 5. At the outer end of this nipple is a spring-seated check valve 7 preferably of the ball type, which closes away from the chamber 5 and opens theretoward.

Enclosing the valve and extending outwardly thereof is a tubular extension 8, mounted on the outer end of the nipple 6, said extension being tapped at its outer end to receive a plug 9, or the nozzle or tube of a grease gun.

The valve 7 is preferably mounted in a casing 10 separate from the members 6 and 8, and removable at will so that it may be inspected and cleaned etc. if necessary.

In order to avoid if desired the ordinary form of exterior leaf-holding clips commonly used for preventing transverse movement of the leaves relative to each other, I provide vertical stems 11 mounted in the lower leaf on each side of the center of length thereof, which stems or pins, of suitable cross sectional shape and area, project upwardly through the slots 4 of the chamber 5, closely fitting the side walls of said slots, which are of course in vertical alinement, and terminating adjacent the under face of the upper leaf. These stems, as will be evident, prevent lateral displacement of the leaves far better than the more or less loose clips usually used. This is because the stems can be made to have a tighter fit in the grooves than the clips could have against the outer faces of the leaves, without interfering with the longitudinal spring movement between the leaves, since while the clips are subject to rust and hence apt to seize against the leaves if too tightly engaging the spring, my interior stems are constantly kept well lubricated. Apart from this, the spring of course presents a neater appearance.

To enable the lubricant to pass by the stems, as is necessary to fill the portions of the chamber therebeyond, said stems are horizontally grooved on their opposite side faces as at 12, said grooves being preferably arranged in staggered relation so as not to weaken the stems.

The stems 11 in cross section are preferably wider lengthwise of the slots 4 than transversely thereof, so that they cannot turn in the slots. The ends of said stems which are secured to the bottom leaf 2 are round however so as to fit and be headed into ordinary drilled holes in said leaf. The diameter of the round portion of the stems is not greater than the transverse width thereof, so that the overhang of the main stem portion above the round portion in a plane longitudinally of the leaves, forms shoulders to abut against the leaf 2, as shown in Fig. 1.

The usual center or king bolt 13 passing through all the leaves is also drilled or slotted as at 14 to enable the lubricant to pass thereby.

The member 9 may function other than as a mere plug, since I have in mind to provide grease cartridges to insert into the member 8, said cartridge being then forced past the check valve by screwing the plug 9 into said member 8, so that the plug thus becomes a jack screw.

Also, if sufficiently wide, as in heavy springs, orifices may be placed through the pins 11 instead of the grooves shown.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A leaf-spring comprising a plurality of superimposed leaves, a chamber for the reception of a lubricant formed between the upper and lowermost leaves, and means enclosed in said chamber for preventing lateral displacement of the leaves relative to each other while allowing longitudinal spring movement therebetween being had.

2. A leaf-spring comprising a plurality of superimposed leaves, a chamber for the reception of a lubricant formed between the upper and lowermost leaves, vertical stems fixed in one of the solid leaves and extending through the chamber to the other solid leaf, the stems having close contact with the side walls of the chamber.

3. A leaf-spring comprising a plurality of superimposed leaves, a chamber for the reception of a lubricant formed between the upper and lowermost leaves, vertical stems fixed in one of the solid leaves and extending through the chamber to the other solid leaf, the stems having close contact with the side walls of the chamber, the stems having horizontal passages to allow passage of the lubricant therepast.

In testimony whereof I affix my signature.

HONG KIM SEUNG.